United States Patent
Vaios

(10) Patent No.: US 6,272,216 B1
(45) Date of Patent: Aug. 7, 2001

(54) CUSTOMER SELF ROUTING CALL CENTER

(75) Inventor: Christos Vaios, Shrewsbury, NJ (US)

(73) Assignee: Avaya Technology Corp, Basking Ridge, NJ (US)

(*) Notice: Subject to any disclaimer, the term of this patent is extended or adjusted under 35 U.S.C. 154(b) by 0 days.

(21) Appl. No.: 09/088,245

(22) Filed: Jun. 1, 1998

(51) Int. Cl.$^7$ .......................... H04M 3/523; H04M 11/00; H04M 7/00; H04Q 3/64; G06F 3/00

(52) U.S. Cl. ...................... 379/265; 345/339; 379/93.17; 379/210; 379/220; 379/266

(58) Field of Search ...................... 345/339, 348, 345/349, 351; 379/265, 266, 309, 210, 214, 219, 220, 221, 93.17

(56) References Cited

U.S. PATENT DOCUMENTS

| | | | |
|---|---|---|---|
| 5,444,774 | 8/1995 | Friedes | 379/266 |
| 5,463,681 | 10/1995 | Vaios et al. | 379/189 |
| 5,684,872 | 11/1997 | Flockhart et al. | 379/266 |
| 6,064,730 | * 5/2000 | Ginsberg | 379/265 |

OTHER PUBLICATIONS

U.S. application Ser No. 08/871,445, filed Jun. 1997, Ginsburg.
U.S. application Ser. No. 60/019,985, Ginsburg.

* cited by examiner

*Primary Examiner*—Harry S. Hong
(74) *Attorney, Agent, or Firm*—Duane Morris & Heckscher LLP

(57) ABSTRACT

A self-routing calling center system provides the caller with a graphical display showing a plurality of resources. The resources may include voice telephone by which the caller talks to an agent, a video device, a voice mail system, an electronic mail system or a wireless electronic communication system. The information may include, for example, the background, capabilities or credentials of the human agents, and the specifications and location of hardware resources. The system allows a customer to select multiple preferred agents and/or resources, and initiate multiple calls. Subsequently, the caller can connect to the first one of the preferred agents to become available, while simultaneously dropping the other calls. The system also provides a customer with information about routing alternatives, if any of the agents can be reached at an alternate telephone. While the caller is waiting from the requested agents or resources to become available, the caller can change or delete one or more of the pending calls.

25 Claims, 4 Drawing Sheets

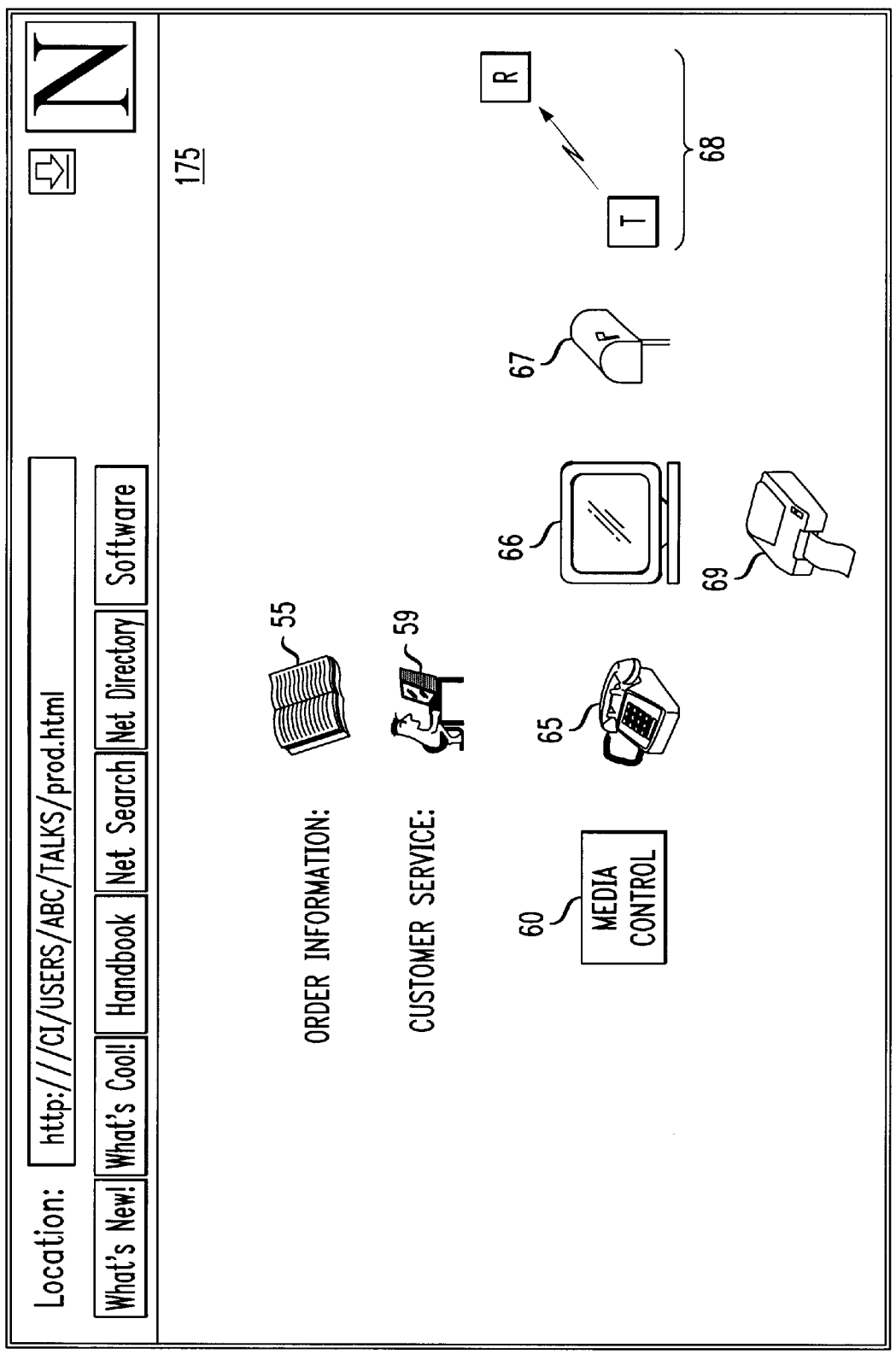

CUSTOMER SELF ROUTING CALL CENTER

TECHNICAL FIELD

This invention relates to telephone networks generally, and more specifically to call centers for receiving and routing calls.

BACKGROUND OF THE INVENTION

Call centers are systems that enable a number of agents to handle incoming and/or outgoing calls. These calls are sent to and received by whichever of the agents are available at the time of the call.

Call centers often use call-related information such as the calling number or the called number to determine what treatment to give each call before the call is answered. They also give access (queue an incoming call for answering and/or answer the call) or deny access (return a busy signal). Typically, such call centers do not make a determination of the needs of the caller making the call. Instead, the caller's needs are determined by an agent only after the agent has answered the call.

It is desirable to provide a system that provides callers with greater control over the handling of their calls and routes calls more efficiently.

SUMMARY OF THE INVENTION

The present invention is a call center which provides greater caller control by providing the caller more information in a graphical display format, and accepting caller inputs to allow the caller to decide how the call is processed by the call center.

According to one aspect of the invention, the system provides the caller with a graphical display showing a plurality of resources. The resources may include voice telephone by which the caller talks to an agent, a video device, a voice mail system, an electronic mail system or a wireless electronic communication system. The information may include, for example, the background, capabilities or credentials of the human agents, and the specifications and location of hardware resources. The system allows a customer to select multiple preferred agents and/or resources, and initiate multiple calls; subsequently, the caller can connect to the first one of the preferred agents to become available, while simultaneously dropping the other calls. The invention also provides a customer with information about routing alternatives, if any of the agents can be reached at an alternate telephone or destination address. While the caller is waiting from the requested agents or resources to become available, the caller can change or delete one or more of the pending calls.

These and other aspects of the invention are described below with reference to the drawings and the exemplary embodiment.

BRIEF DESCRIPTION OF THE DRAWINGS

In the Drawings:

FIG. 4 is a screen display of an exemplary customer interactive display as shown in FIG. 1.

DETAILED DESCRIPTION OF AN EXEMPLARY EMBODIMENT

This application is related to the system disclosed in U.S. patent application Ser. No. 08/871,445 and U.S. provisional patent application ser. No. 60/019,985, each of which is incorporated by reference herein in it entirety.

Figure 1:
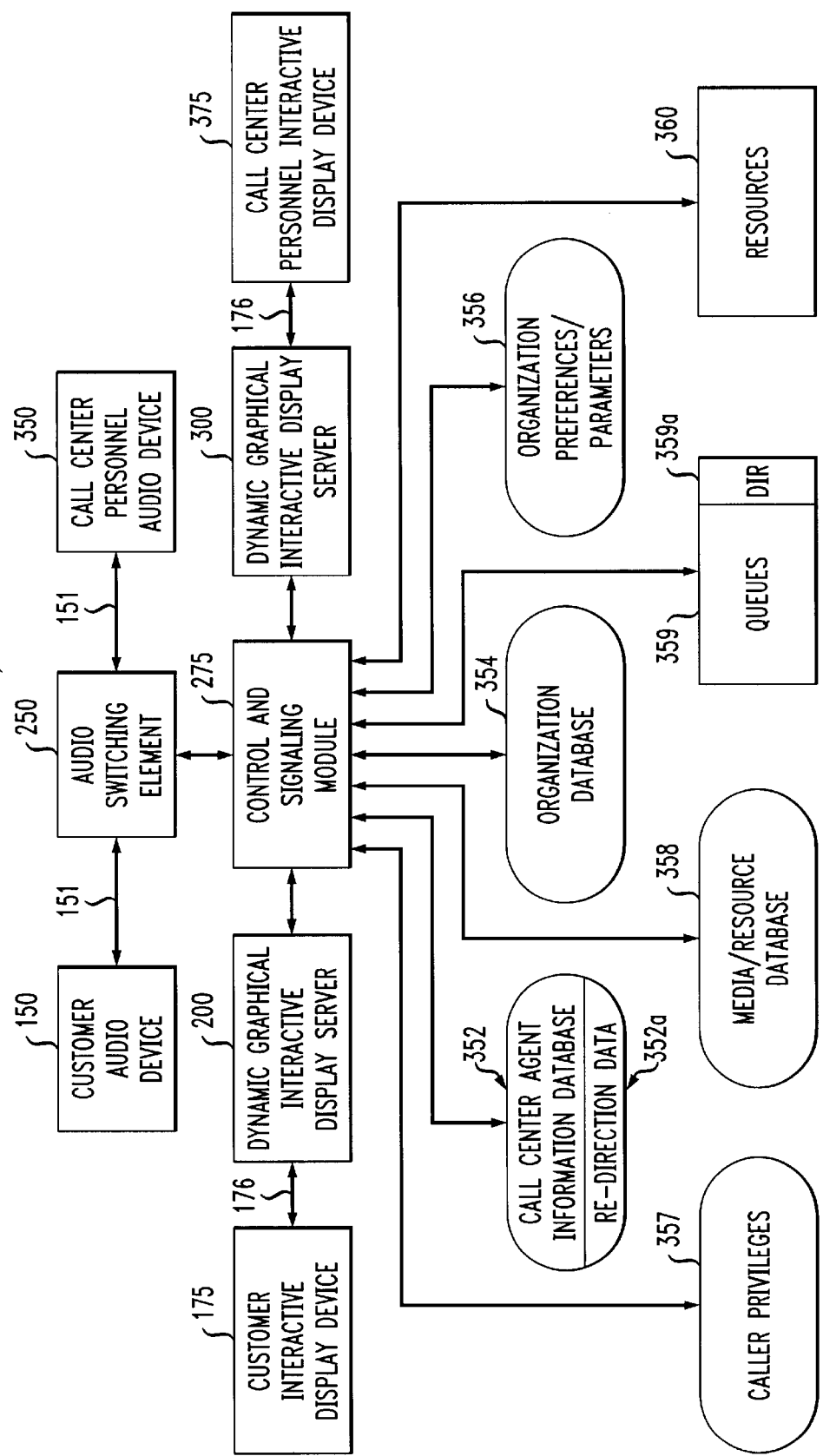
FIG. 1 is a block diagram of a call center according to the present invention.

FIG. 1 is a block diagram of an exemplary system according to the present invention. The exemplary system includes the full functionality of a conventional calling center using a private branch exchange (PBX) for routing in-coming calls. As in a conventional PBX, an in-coming call is routed across a phone network 151 through the audio switching element 250 and reaches call center personnel. Both the caller and the call center personnel have audio devices 150 and 350, which may be telephones, microphones, headsets, intercoms, or other conventional audio input devices. Calls are either directed manually by call center personnel, or automatically routed using a conventional system which typically connects the caller to the first available agent.

The present invention allows the caller to control the handling of the call, both with respect to the agent to whom the caller is connected, and with respect to a variety of alternative media which may be used to service the caller. According to one aspect of the invention, the system further includes a control and signaling module 275 which the caller can use to initiate and control the call. The basic functions of control and signaling module 275 are described below. Additional details of an exemplary control and signaling module are provided in U.S. patent application Ser. No. 08/871,445 by Ginsberg, which is incorporated by reference herein.

Control and signaling module 275 communicates with a caller by way of a dynamic graphical interactive display server 200. The caller can initiate the call by way of an interactive display device 175 which may be a computer, terminal or other data interface device. In a preferred embodiment of the invention, the customer interactive display device 175 executes an Internet browser program, such as, for example, Netscape, Navigator™ program by the Netscape Communications Corporation, or Internet Explorer™, by Microsoft Corporation, Redmond, Wash. Conventional browser programs provide the capability to receive applets, which are software programs capable of generating interactive displays. For example, software applets may be programed in the Java language and stored in interactive display server 200. The caller can initiate interaction with display server 200 by way of a communications network which may be a local area network (LAN), or a global communications network, such as the Internet. The applets can generate a plurality of displays to the caller. This interface provides the caller with control over the handling and routing of the call. Once the requested agent becomes available, the control and signaling module directs the audio switching element 250 to connect the customer audio device 150 to the call center personnel audio device 350.

Control and signaling module 275 has access to a plurality of information sources. These information sources include call center agent information database 352, organization database 354, organization preferences/parameters 356, caller privileges 357, and media/resource database 358. In FIG. 1, these information sources are shown as separate entities, for illustrative purposes only. One of ordinary skill in the art recognizes that the same data may be organized in a variety of fashions. For example, each of these data sources may be stored within a respective table in a single relational database, managed by a single database management system. Alternatively, the data may reside in any number of specialized files.

The purpose of each of these data sources is described below in greater detail. In addition to the data sources 352 through 358, control and signaling module 275 also controls a plurality of queues 359 and resources 360, which are also described in greater detail below.

Call center agent information database 352 provides information pertaining to agents or resources. For example, the information may include data relating to all of the personnel within the organization, including the qualifications and credentials of each of the agents available to respond to calls. Preferably, the information in organization database 354 is made available to the caller through a flexible query system, such as Query by Example, so that the caller can request an agent by specifying the organization to which a desired person belongs, or any other data attribute (relating to publicly available information) about the personnel stored in the database.

Organization preferences/parameters database 356 contains information that is used to tailor the displays to individual known callers.

Call center agent information database 352 contains dynamic information regarding the availability of each agent at any time. Database 352 may also include re-direction data 352a for re-directing calls in certain circumstances described below.

Caller privileges data 357 may be used to limit caller access to certain system functions. For example, specified individual callers may be given the privilege to input high-priority calls or communications, which are serviced before previously enqueued low-priority calls which are already waiting to be serviced. Similarly, certain callers may have privilege to preempt specific resources that are already in use, without waiting for the current user of that resource to relinquish the resource.

Media/resource database 358 contains information regarding hardware resources which are available to outside callers. Depending on how the user wishes to operate the system, outside callers may have access to all of the networked resources in the system. Alternatively, certain resources may be restricted to internal personnel; if greater granularity is desired, specific outside callers may have access to certain networked resources, while general external callers are denied access to those resources.

Figure 2:
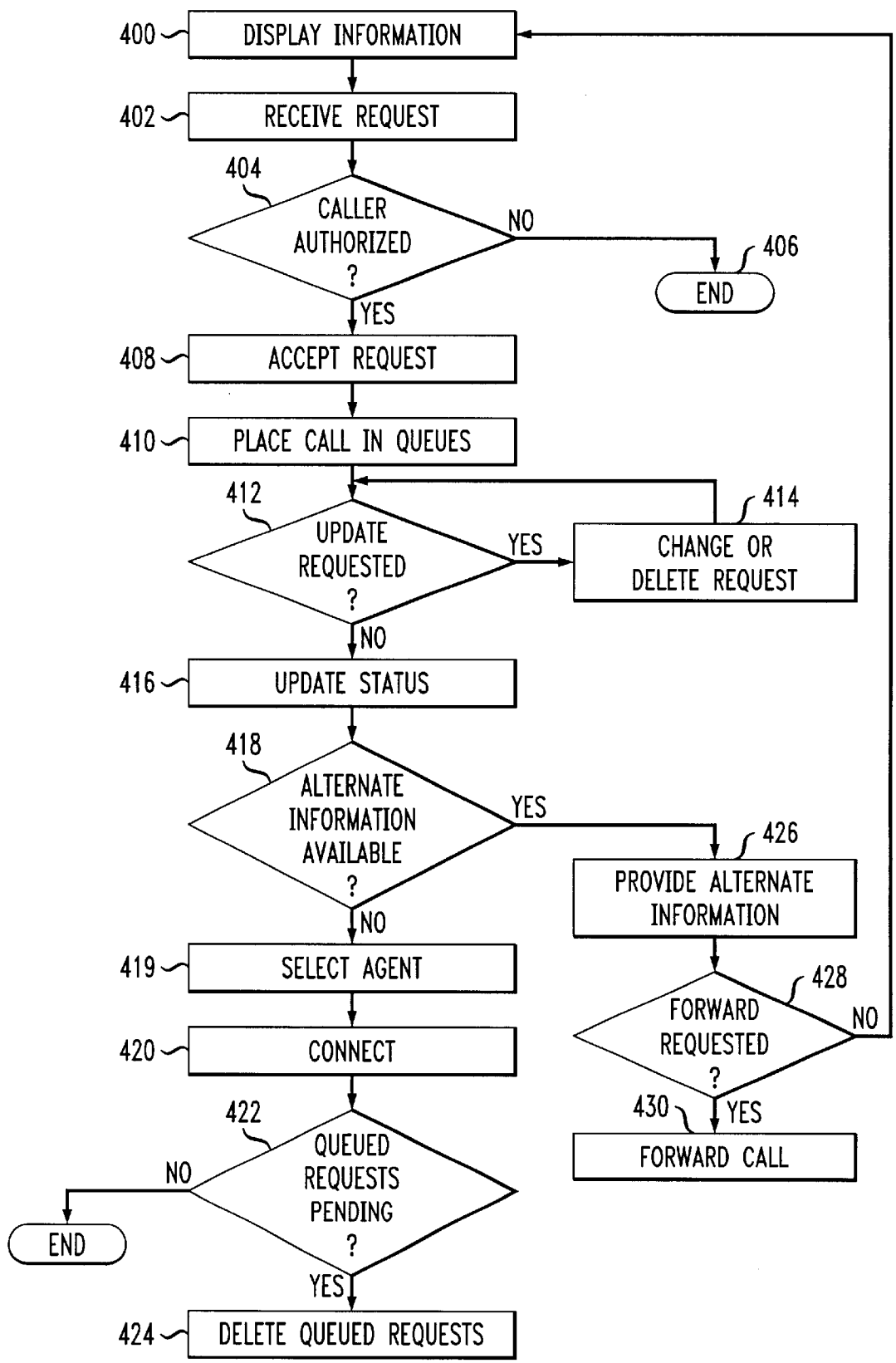
FIG. 2 is a flow chart diagram of an exemplary method for handling calls according to the invention.

FIG. 2 is a flow chart diagram of an exemplary process for handling a call, as performed by control and signaling module 275. At step 400, graphical interactive display server 200 downloads information to customer interactive display device 175. Preferably, the information is displayed by way of a sequence of hierarchically arranged information displays, allowing the user to navigate through the organization and system resources. For example, one exemplary display is shown in FIG. 4. FIG. 4 allows the caller to navigate through the system by one of three different mechanisms. For example, if the user selects order information 55, a series of displays are presented to the caller allowing the caller to track an order or create a new order. If customer service is selected, the caller is presented with a plurality of displays which allow the caller to navigate through the organization to the department or group to whom the user wishes to speak. If media control 60 is selected, the user has the option to submit requests for a variety of resources 360. These requests for resources 360 may be enqueued in the same fashion as a telephone call, so that users have access to a plurality of media representations on a first in, first out (FIFO) basis. These media may include, but are not limited to, voice 65, video display 66, electronic mail 67, wireless communications medium 68 (which may, for example, be radio frequency or infrared) or a data queue (for facsimile service) 69.

Graphical interactive display server 200 transmits display data graphically, providing information concerning the specifications of a selected resource, or the qualifications and experience of a selected agent. In addition, the call center agent information database 352 provides dynamic data which may be included in the displays, so that the caller can see the estimated waiting time for the requested resource or agent.

In addition to the estimated waiting time, control and signaling module can calculate and transmit to the caller an estimated delivery time for the requested resource. The meaning of the estimated delivery time of the resource depends on the type of resource. For example, if the resource is a human agent, the estimated delivery time could take into account an average length for that specific agent's conversations with callers. The system can collect empirical data for each agent and each resource, and continually update the statistics to predict the waiting time and delivery time for each individual agent and resource based on that person or resource's actual history. The system can display this data to the caller in a variety of formats (e.g., alpha-numerical, histogram, etc.). This enables the caller to estimate the total amount of time before his or her conversation with the selected agent is completed. Preferably, the system provides the caller the ability to select the form of the representation.

Alternatively, if the caller requests transmission of a document via electronic mail 67 or facsimile 69, an estimated delivery time might reflect the total time before transmission of the requested data is completed.

At step 402, dynamic graphical interactive display server 200 receives a request from the caller and transmits the request to control and signaling module 275. According to an aspect of the invention, a request may include information for controlling how the request is placed into one or more of the queues 359 in the system.

The invention allows the caller to select a special handling option. Instead of accepting the first available agent for the fastest service time, the caller may specify one or more preferred agents. In a similar manner, if the caller desires access to a specific one of the networked resources 360 of the system (e.g., fax machine 69), the caller can input a preferred subset of the plurality of resources and receive access to the first one of these resources that becomes available to the caller, as described in greater detail below.

In addition to the ability to specify one or more preferred resources or agents, the caller may request high priority handling by way of the graphical interface 175. Preferably, the operator or user of the system has the ability to turn this feature of the system on or off. If the feature is turned off, then all callers are treated as though they do not have privilege to request high-priority handling.

At step 404, the information in the caller privileges database 357 is checked to determine whether the caller is authorized to use the special call handling features that appear in the request. If the caller is not authorized for the requested function, the communication may be terminated at step 406, or the caller may be directed back to a previous screen to submit a new or modified request. (Step 402).

If no function requiring authorization is requested, or if the caller is authorized to request the functions specified, then at step 408 the request is accepted. At step 410, the request is placed in one or more of the pending queues. In the exemplary embodiment, each resource 360, including agents, has a corresponding queue. The caller can select one or any number of these queues.

For an ordinary caller, the call is placed at the end of each respective queue selected by the caller, so that calls are handled on a FIFO basis. If the organization preferences database 356 indicates that all calls for this caller receive priority treatment, then the call is not placed at the end of the queue. Rather, the call is placed in front of the next low-priority call in the queue. If there are more than one high-priority calls in the queue, all of the high-priority calls for that resource or agent are handled on a FIFO basis before any of the low-priority calls for that resource or agent are handled. Similarly, a caller having priority privileges in the caller privileges database 357 may request priority handling for a specific call and receive priority handling for that call.

One of ordinary skill in the art recognizes that following step 410, there may be a plurality of calls enqueued for a single caller. The system initiates a plurality of actual calls from audio switching element 250, each call corresponding to a respective agent or resource that the caller is trying to reach. The plurality of calls are all handled in parallel until the caller connects with the desired resources/agent at step 420, described below. For brevity, the steps between step 410 and step 420 are only described once herein; one of ordinary skill recognizes that the steps are executed in parallel for each of the plurality of pending call requests.

At step 412, the caller can request one or more of the calls pending be changed or deleted. At step 414, the change or deletion request is entered. Steps 412 and 414 may be repeated any number of times, either for a single pending call request or for a plurality of call requests. If the caller adds another agent or resource, another call can be initiated, but the caller is placed at the end of the queue for that agent/resource.

At step 416, the status of the updated request is displayed to the caller.

At step 418, if there is redirection data 352*a* in the information database 352, the caller is provided information regarding an alternate method for connecting the caller with either a specific requested resource or a desired person associated with the specific requested resource. For example, an alternate phone number at which a desired agent is available may be provided to the caller. At step 426, availability of any alternate routing information is provided to the caller. At step 428, if the caller so requests, then step 430 is executed and the call is redirected to another resource. If the caller does not request redirection of the call, then the caller can return to step 400 and input new information for a new request.

At step 419, an agent becomes available, and the system may now identify which agent will service the call. This process is described in greater detail below with reference to FIG. 3.

At step 420, the caller is provided access to the requested agent and/or all of the requested resources. This may include re-direction to call center personnel by way of a graphical interactive display server 300 and an interactive display device 375, or by way of one of the other resources 360. Once the requested agent becomes available, the control and signaling module directs the audio switching element 250 to connect the customer audio device 150 to the call center personnel audio device 350.

In addition to the queues 359, the system maintains a directory 359*a* for the purpose of tracking all of the multiple-agent requests. When a connection is made at step 420, a check is made at step 422 to determine whether the call is a multiple-agent or multi-resource request for which additional spawned requests (calls) are still pending. If no such queued requests for this same caller are still pending, then execution ends. If, however, additional queued requests were spawned as part of a multiple-agent or multiple-resource request on behalf of this caller, then at step 424, all of the remaining pending requests are deleted from the system. The call termination procedure may, for example, be as described in U.S. Pat. No. 5,463,681 to Vaios et al., which is incorporated herein by reference.

Because the exemplary embodiment allows a caller to place requests in multiple queues, and because these requests are processed asynchronously, the caller is able to select a subset of preferred agents or resources, any of which or whom are acceptable to the caller. The caller is able to minimize the expected waiting time for any one of his or her preferred agents/resources.

One option available to the caller is to emulate the conventional single queue mechanism, which provides the fastest expected service. According to this conventional method, all pending call requests are placed into a single queue, which is serviced by a plurality of agents. As each agent becomes available to answer a call, the next caller in the single queue is directed to the available agent. This may be emulated using the invention by selecting all of the available agents. A call is initiated corresponding to each agent, and a spawned copy of the caller's request is placed in each agent's queue. When the first agent becomes available, the caller is connected to that first available agent, and the remaining calls are dropped.

One of ordinary skill recognizes that the caller has the option of selecting all of the available agents that satisfy his or her criteria, or all of the available resources of the type that is desired by the caller. In this case, the spawned request is placed in the corresponding queue for each of the agents in the desired group or department. The average queuing delay will be similar to that experienced in the case of a single queue for all of the agents or resources.

Figure 3:
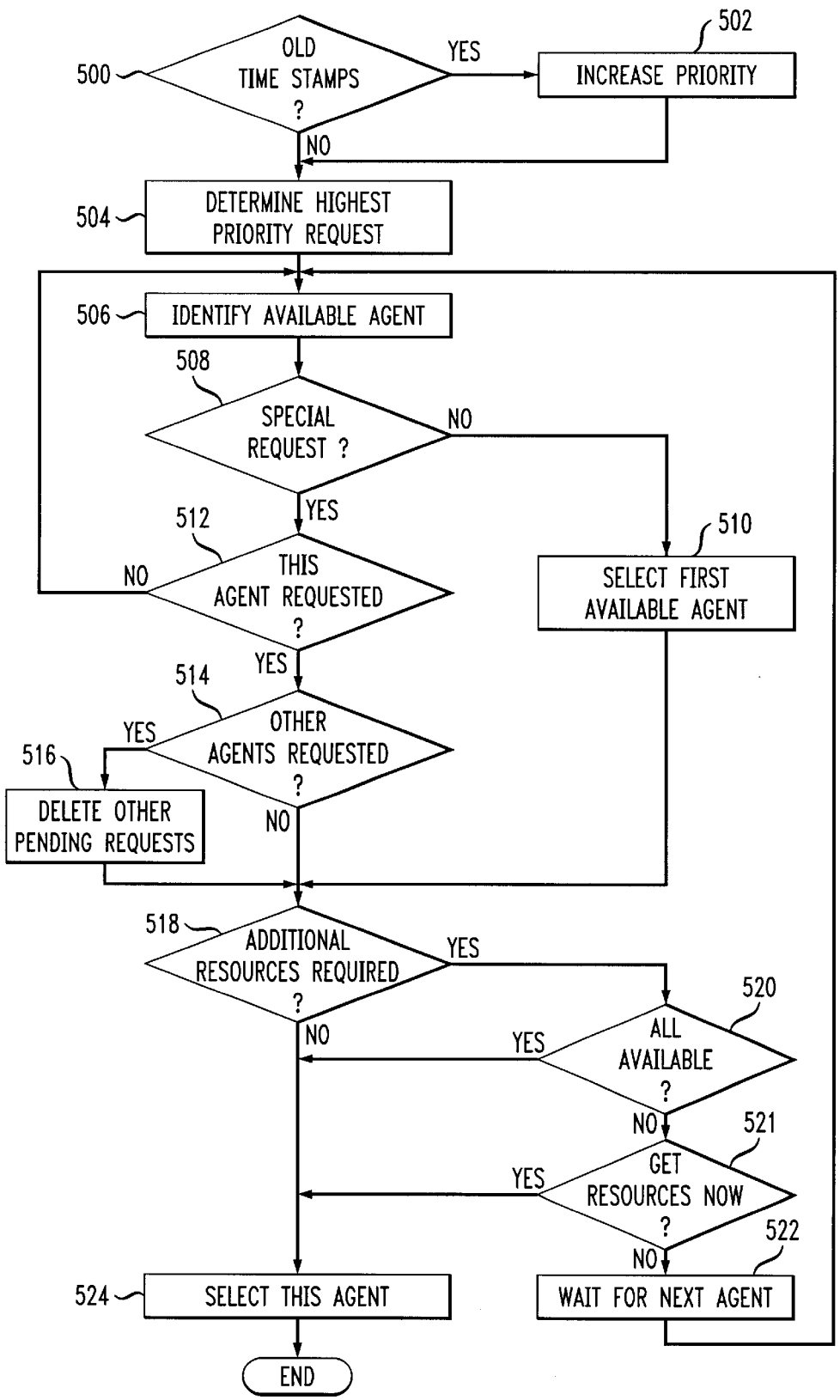
FIG. 3 is a flow chart diagram of the agent and resource selection step of FIG. 2.

FIG. 3 is a flow chart diagram showing the agent selection process of step 419 in greater detail.

At step 500, the content of the queued request may be used to determine the handling of the request. In particular, for example, the time stamp of the request may be checked. To ensure that priority processing does not result in extremely long delays for any of the low-priority messages or requests, any queued request for which the time stamp indicates that the message age is greater than a predetermined threshold, it is automatically increased in priority at step 502.

Then, at step 504, the request in the queue having the high-priority is examined next. Based on information from call center agent information database 352, control and signaling module 275 identifies when an agent becomes available at step 506.

At step 508, the next request in the queue is compared to the available agent. If the user has specified no preference, or if the user has selected all of the agents, then at step 510, the first available agent is selected for this user and control is transferred to step 518.

At step 512, if the agent who has become available (or the resource that has become available) is not the one requested by the caller, then control is transferred to step 506, and the request awaits the next available agent (next available agent). Otherwise, step 514 is executed next.

At step 514, a determination is made whether other agents have been requested. If so, then at step 516, all of the other pending requests for other agents are deleted.

At step 518, a determination is made whether additional resources are required to process this call. For example, the user may request both a voice phone line and a fax machine to transmit to the agent to whom the call is directed.

At step 520, if all requested resources are available, then control is transferred to step 524 and this agent and the requested resources is selected or identifies to satisfy the call.

If, however, other resources are required, and at step 520 those resources are not all available, then at step 521, the caller can decide whether to go get any additional resources required now, and remain with the currently identified agent.

If the caller decides not to obtain the required resources and remain with the currently identified agent, then at step 522, the pending request waits for the next available agent within the subset of agents requested by the caller. In that case, control again transfers to step 506.

Although a specific example is described above, one of ordinary skill in the art recognizes that similar results may be achieved through insubstantial rearrangements of the order of the steps shown in FIGS. 2 and 3, or insubstantial change to the organization of the data shown in FIG. 1.

Although an exemplary embodiment keeps track of the various spawned calls by a plurality of queue data structures, other mechanisms may be used for ensuring that only one call is maintained after the caller is connected with an agent. For example, since the initial communications are handled via computer communications, the spawned calls may be represented by data objects, each including a routine or procedure that notifies all of the other pending spawned calls to terminate, as soon as that call object changes state from a pending state to an active (connected) state.

Although the invention has been described in terms of exemplary embodiments, it is not limited thereto. Rather, the appended claim should be construed broadly, to indicate other variants and embodiments of the invention which may be made by those skilled in the art without departing from the scope and range of equivalents of the invention.

What is claimed is:

1. A system for routing a call from a caller comprising:
    means for providing to the caller a display showing a plurality of resources;
    means for receiving from the caller a plurality of concurrent, separate requests for two or more of the plurality of resources;
    means for determining when a first one of the two or more requested resources becomes available to handle the call; and
    means for connecting the caller to the first one of the two or more requested resources.

2. A system according to claim 1, further comprising queuing means for concurrently placing the separate queue requests into two or more separate and distinct queues on behalf of the caller, each of the two or more queues being associated with a respective one of the two or more requested resources.

3. A system according to claim 2, further comprising, means for deleting any queue request still pending in any of the two or more queues after the caller is connected to the first resource.

4. A system according to claim 2, further comprising, means for changing or deleting one of the queue requests, in response to a change request or deletion request from the caller or a user of the system.

5. A system according to claim 1, wherein the request receiving means comprises:
    means for checking whether the caller is authorized to request more than one resource, and
    means for only accepting a request from the caller for two or more resources if the caller is authorized.

6. A system according to claim 1, wherein each of the resources is a telephone by which the caller can communicate with a human agent.

7. A system according to claim 1, wherein each of the resources is one of the group consisting of a video device, a voice mail system, an electronic mail system or a wireless electronic communication system.

8. A system according to claim 7, further comprising, means for providing the caller information regarding an alternate method for connecting the caller with:
    (i) a specific one of the requested resources; or
    (ii) a desired person associated with the specific requested resource.

9. A system according to claim 8, further comprising means for automatically re-directing the call to route the caller to the desired person.

10. The system of claim 7, wherein the display providing means include means for graphically displaying information concerning the specifications or availability of one of the resources, or the qualifications of an agent associated with the one resource.

11. The system of claim 10 wherein the information includes at least one of the group consisting of an estimated waiting time for the requested resource and an estimated delivery time for the requested resource.

12. A system for routing a call from a caller comprising:
    means for providing to the caller a display showing a plurality of resources;
    means for receiving from the caller a plurality of concurrent, separate requests for two or more of the plurality of resources;
    means for selecting one of the two or more requested resources based on at least one attribute of the request; and
    means for connecting the caller to the selected resource.

13. A system according to claim 12, wherein the attributes include at least one of the group consisting of a time stamp of the request, a priority of the request, and a set of at least two of the plurality of resources required to handle the call.

14. A system for routing a call from a caller comprising:
    a server processor which generates and transmits to the caller signals which cause a display proximate to the caller to display information identifying a plurality of resources;
    said server processor receiving and accepting from the caller a plurality of concurrent, separate requests for two or more of the plurality of resources;
    said server processor determining when a first one of the two or more requested resources becomes available to handle the call; and
    a switch responsive to the server processor, said switch connecting the caller to the first one of the two or more requested resources.

15. A method of routing a call from a caller comprising the steps of:
    (a) providing to the caller a graphical display showing a plurality of resources;

(b) receiving from the caller a plurality of concurrent, separate requests for two or more of the plurality of resources;

(c) determining when a first one of the two or more requested resources becomes available to handle the call; and (d) connecting the caller to the first one of the two or more requested resources.

16. A method according to claim 15, further comprising, between steps (b) and (c), the step of concurrently placing queue requests into two or more separate and distinct queues on behalf of the caller, each of the two or more queues being associated with a respective one of the two or more requested resources.

17. A method according to claim 16, further comprising, after step (d), the step of deleting any queue request still pending in any of the two or more queues after the caller is connected to the first resource.

18. A method according to claim 17, further comprising, between steps (b) and (c) the step of changing or deleting one of the queue requests, in response to a change request or deletion request from the caller.

19. A method according to claim 15, further comprising, between steps (b) and (c):

(b1) checking whether the caller is authorized to request more than one resource, (b2) only accepting a request from the caller for two or more resources if the caller is authorized.

20. A method according to claim 15, wherein each of the resources is a telephone by which the caller can communicate with a human agent.

21. A method according to claim 15, wherein each of the resources is selected from the group consisting of a video device, a voice mail system or an electronic mail system.

22. A method according to claim 21, further comprising, between steps (b) and (c), the step of providing the caller information regarding an alternate method for connecting the caller with:

(i) a specific one of the requested resources; or (ii) a desired person associated with the specific requested resource.

23. A method according to claim 22, further comprising automatically redirecting the call to route the caller to the desired person.

24. The method of claim 21, further comprising the step of displaying information on a display concerning the specifications or availability of one of the resources, or the qualifications of an agent associated with the one resource.

25. The method of claim 24 wherein said information includes the estimated waiting time for the requested resource.

* * * * *